No. 662,978. Patented Dec. 4, 1900.
C. G. SCHMIDT.
MIXING MACHINE.
(Application filed Jan. 17, 1900.)
(No Model.)
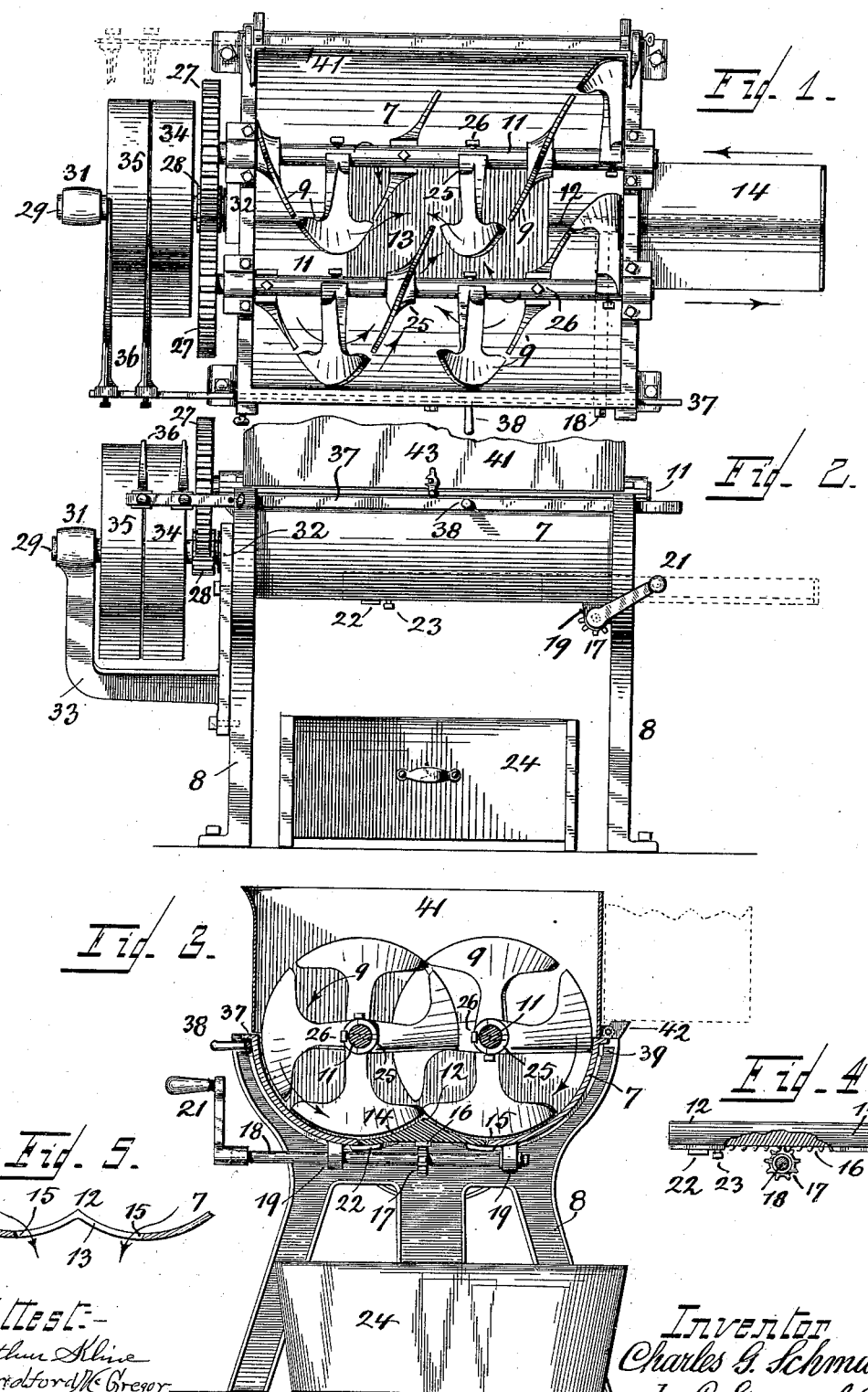
Inventor
Charles G. Schmidt
by C. Spengel Atty.

UNITED STATES PATENT OFFICE.

CHARLES G. SCHMIDT, OF CINCINNATI, OHIO.

MIXING-MACHINE.

SPECIFICATION forming part of Letters Patent No. 662,978, dated December 4, 1900.

Application filed January 17, 1900. Serial No. 1,725. (No model.)

*To all whom it may concern:*

Be it known that I, CHARLES G. SCHMIDT, a citizen of the United States, and a resident of Cincinnati, Hamilton county, State of Ohio, have invented certain new and useful Improvements in Mixing-Machines; and I do declare that the following is a description of the invention sufficiently clear, full, and exact to enable others skilled in the art to which it appertains to make and use the same, attention being called to the accompanying drawings, with the reference-numerals marked thereon, which form also a part of this specification.

This invention relates to machines for agitating plastic masses like comminuted or chopped meat, dough, and similar substances, the object being to thoroughly intermix the ingredients composing such masses. Such devices consist generally of a suitable vessel within which the masses are contained and which is provided with operating means for agitating the same.

The invention consists of certain features of construction, as hereinafter shown and described, and forms substantially improvements upon a machine illustrated in Patent No. 514,048, which patent passed by assignment into my possession.

In the following specification, and particularly pointed out in the claim, is found a full description of the invention, together with its operation, parts, and construction, which latter is also illustrated in the accompanying drawings, in which—

Figure 1 is a top view of the machine with parts in position for discharge. Fig. 2 is a side view of it. Fig. 3 is a vertical cross-section taken on a line near the right end of the machine. Fig. 4 is a detail view of a part of the discharge-slide; and Fig. 5 is part of a sectional view of the vessel, the line of section passing through the discharge-opening.

The mass or ingredients to be intermixed are contained in a suitable trough-shaped vessel 7, supported on end frames 8. For agitating it there are blades 9, secured to shafts 11, which are mounted in boxes at the ends of the trough. There are two sets of blades working in opposite directions against each other, each set mounted on a separate shaft, which latter are parallel to each other. The distance between these shafts is so limited as to cause the free ends of the blades on one shaft to reach over and travel through part of the path of the blades on the other shaft, they clearing each other, however, by being attached in alternating positions changed laterally. The interior surface of the trough is shaped to correspond to the path of the outer edge of these blades, so that these latter pass closely to such surface, thereby preventing any dead spaces where unmixed matter might accumulate, and thereby escape the action of the agitators. By reason of the lapping of the paths of these latter a shape results, as most plainly shown in Figs. 3 and 5, causing a longitudinal ridge 12 to appear in the center of the trough. The blades are all set at an angle, so that, they rotating in the direction shown, the mass is constantly worked toward this ridge. The discharge of the mass is through an outlet-opening 13, obtained by removing a portion of the lower part of the trough and normally held closed by a slide 14, resembling in shape exactly the removed part, so that when in position there is no interruption or break in the trough where matter could lodge or accumulate in a manner to be beyond the action of the agitators. For opening or closing it this slide is moved endwise, as shown in Fig. 1, it being supported on the beveled longitudinal edges 15 of opening 13, which serve as guideways for such purpose. To facilitate this movement, I provide a rack 16 on the under side of slide 14, which is engaged by a pinion 17, the shaft 18 of which is supported in bearings 19 and provided at one of its ends with a crank 21 for operation. This latter is preferably removable, so as not to be in the way by reason of its projecting beyond the machine.

To hold the slide positively to its guideways, I provide lugs 22 on its under side, which project over the under side of the adjacent bottom of the trough. The slide is prevented from being moved out too far and beyond engagement with its pinion by a suitable stop 23, which may be in form of a projecting screw. When the time for discharging the contents has arrived, the slide is moved outwardly, as shown in Fig. 1, with the agitators kept going, thus obtaining the advantage of that part of their operation whereby they shove the mass toward the longitudinal center line of the bottom of the trough. To move it, however, also away from the ends of the trough and toward the opening in the bottom thereof, the agitator-blades are so set and shaped as to impart also a longitudinal movement to the mass. For such purpose they are set spirally around their shafts, and they are divided in two sets on each shaft, one set moving the mass away from one end of the trough and the other set on the same shaft moving it away from the other end. It will now be seen that these agitators have a compound action tending to move the mass toward the middle of the trough, one part of the action moving the mass away from the sides of the latter, the other away from its ends. This action is very efficient to obtain a thorough intermingling of the mass, which is thus constantly crowded toward the center of the trough, from where it spreads again by tumbling over the blades, only to be forced again through the same motion. At the same time it is clear how this same action brings about a proper, clean, and quick discharge when the slide is out, because being crowded toward the central part of the bottom of the trough and not finding any check or resistance thereat the mass moves freely out at once. 24 is a receptacle which may receive this discharge. The agitators are each provided with an open hub 25, so that they may be placed sidewise against the shafts, where they are held by screws 26 passing through this latter and tapped into the hubs. For their rotation shafts 11 mount each a cog-wheel 27, which intermesh and one of which is driven by a pinion 28. The shaft 29 of the pinion is mounted in self-contained bearings 31 32, forming each a part of an independent bracket 33, which is bolted to one of the end frames 8. For rotating this pinion-shaft there is a pulley 34, having beside it a loose pulley 35 to receive the belt from the other pulley when the operation of the machine is to be interrupted. A belt-shifter 36 is provided for such purpose, the guide-rod 37 of which is supported in the upper part of end frames 8 and provided with a handle 38 for manipulation. This belt-shifter may be attached to either side of the machine (see dotted lines in Fig. 1) to suit circumstances and location, for which purpose there are additional openings 39 provided on the other side to receive guide-rods 37.

The height of the trough depends on circumstances, particularly on the quantity of the mass to be operated upon and its tendency to splash. It may be increased integrally or by a removable addition 41, resting on the lower part, preferably secured thereto by hinges, and on which it may be thrown back to permit access for cleaning. When so thrown back, it rests on brackets 42, as shown in dotted lines in Fig. 3. A catch 43 is provided to hold it in position while the machine is in operation.

Having described my invention, I claim as new—

In a mixing-machine, the combination of two parallel shafts carrying rotary agitating-blades and so spaced that the circular paths of these blades partly overlap each other, a vessel within which they operate, the lower part of which is shaped to conform to these paths, the shape being substantially that of two half-circular curves intersecting each other at a point below their centers, a discharge-opening 13 in this curved lower part of the vessel, a slide fitted to opening 13 and between the longitudinal edges 15 thereof which are beveled and support the same, the inner surface of this slide being even with the inner surface of the vessel, to the shape of which it conforms and of which it constitutes an unbroken continuation, both opening 13 and the slide therefor extending to one of the ends of the vessel, so as to permit movement of the slide in and out on the longitudinal edges 15 of the opening which thus form guideways for the slide, means for so moving the slide and means to confine the same vertically to the guideways.

In testimony whereof I hereunto set my hand in the presence of two witnesses.

CHARLES G. SCHMIDT.

Witnesses:
C. SPENGEL,
ARTHUR KLINE.